United States Patent
Tsuda et al.

(10) Patent No.: US 8,204,126 B2
(45) Date of Patent: Jun. 19, 2012

(54) VIDEO CODEC APPARATUS AND METHOD THEREOF

(75) Inventors: Kenjiro Tsuda, Osaka (JP); Tatsuro Juri, Osaka (JP); Katsuo Saigo, Hyogo (JP); Takashi Masuno, Osaka (JP); Yuki Kobayashi, Osaka (JP); Takuma Chiba, Osaka (JP); Yukinaga Seki, Kyoto (JP); Hiroaki Shimazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 774 days.

(21) Appl. No.: 12/350,354

(22) Filed: Jan. 8, 2009

(65) Prior Publication Data

US 2009/0180543 A1 Jul. 16, 2009

(30) Foreign Application Priority Data

Jan. 10, 2008 (JP) .................................. 2008-003729

(51) Int. Cl.
*H04N 7/12* (2006.01)
*G06K 9/36* (2006.01)

(52) U.S. Cl. .................................. 375/240.16; 382/236

(58) Field of Classification Search .................. None
See application file for complete search history.

(56) References Cited

U.S. PATENT DOCUMENTS

2004/0101058 A1  5/2004  Sasai et al.
2007/0127572 A1*  6/2007  Sasai et al. ............... 375/240.16
2009/0135901 A1*  5/2009  Au et al. .................. 375/240.02

FOREIGN PATENT DOCUMENTS

JP                2005-6275            1/2005

* cited by examiner

*Primary Examiner* — Steven H Nguyen
*Assistant Examiner* — Jutai Kao
(74) *Attorney, Agent, or Firm* — Wenderoth, Lind, Ponack, L.L.P.

(57) ABSTRACT

An optimal interpolation frame is achieved by estimating optimal motion vectors both for a coding process and an interpolation frame generating process. A video codec apparatus coding and decoding a video and generating an interpolation frame in the decoding includes a motion vector estimation unit calculating an evaluation value to evaluate a correlation between images using a calculating formula and estimates a motion vector using the evaluation value, a motion vector coding unit coding video data using the motion vector and outputs a coded stream, video decoding unit decoding the coded stream and outputs video frames generated by the decoding, a frame interpolation unit generating interpolation frame using the motion vector, a cost calculating formula selecting unit selecting the calculation method depending upon whether the coding by the motion vector coding unit or the generating an interpolation frame by the frame interpolation unit is being executed.

9 Claims, 11 Drawing Sheets

| Operation mode | Feature of cost calculating formula | |
|---|---|---|
| Interpolation frame generating mode | Weights correlation | Ex. $C = x$ |
| Coding mode | Weights amount of code | Ex. $C = x + a \cdot y$ |

VIDEO CODEC APPARATUS AND METHOD THEREOF

BACKGROUND OF THE INVENTION (1) Field of the Invention

The present invention relates to a video codec apparatus capable of generating an interpolation frame in a decoding process, and more particularly, to a video codec apparatus and a method that reduce an amount of calculation for estimating a motion vector and a size of hardware that are necessary for generating an interpolation frame at an optimal cost and with the least image deterioration.

(2) Description of the Related Arts

When video data is played back, additional frames are interpolated between video frames for certain purposes. For example, a video camera plays back video data while generating and displaying interpolation frames in an extended reproduction time for the purpose of smooth reproduction in slow motion. As another example, a television with a liquid crystal display generates and displays interpolation frames in a usual reproduction time for the purpose of improving time resolution of the liquid crystal display. In other words, this achieves reproduction at a high frame rate. As another example, mobile equipment plays back video data recorded at a low frame rate while generating and displaying interpolation frames in order to achieve display equivalent with that at a normal frame rate.

Figure 10:
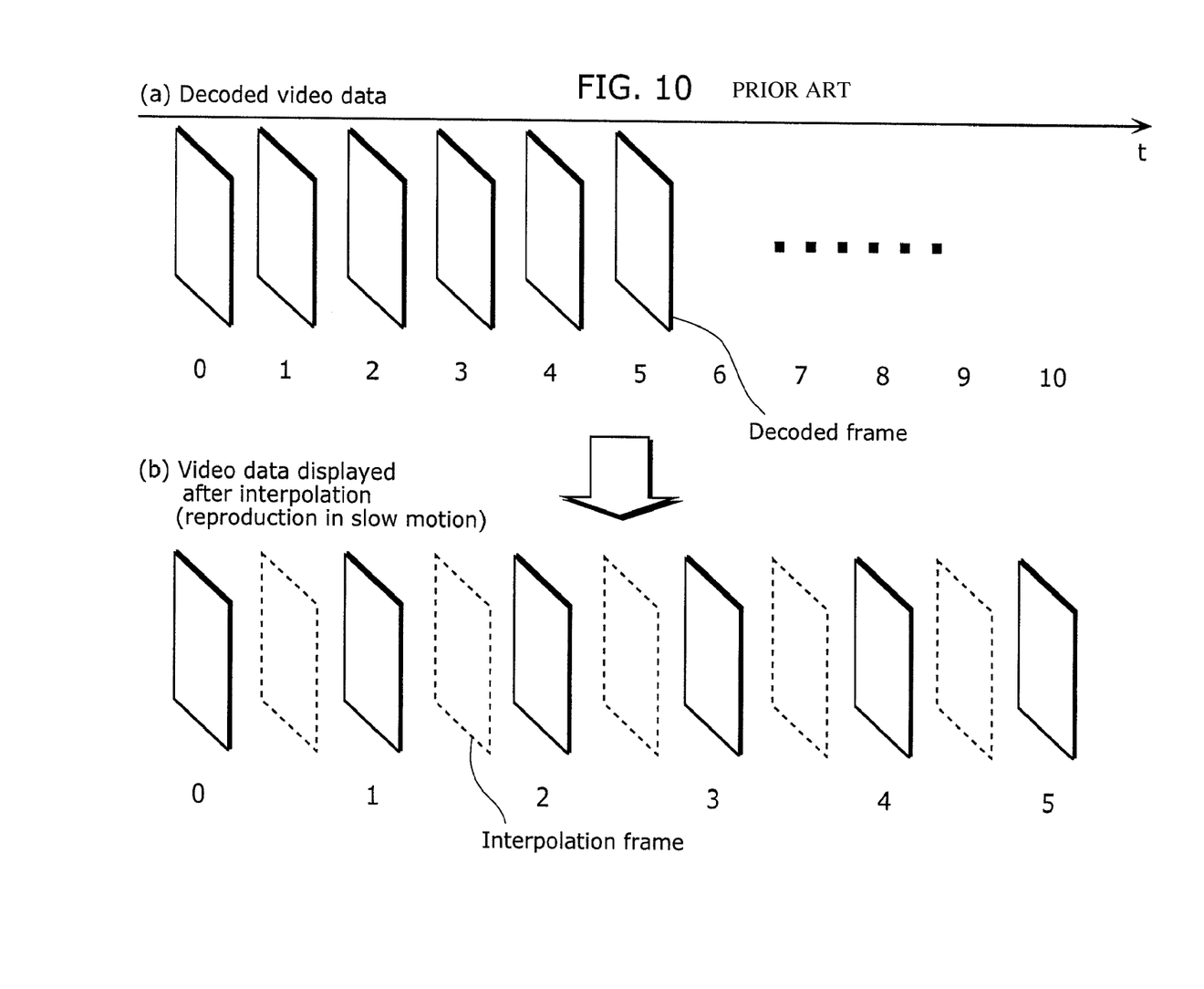
FIG. 10 shows a basic concept regarding generation of interpolation frames for the purpose of reproduction in slow motion.
Figure 11:
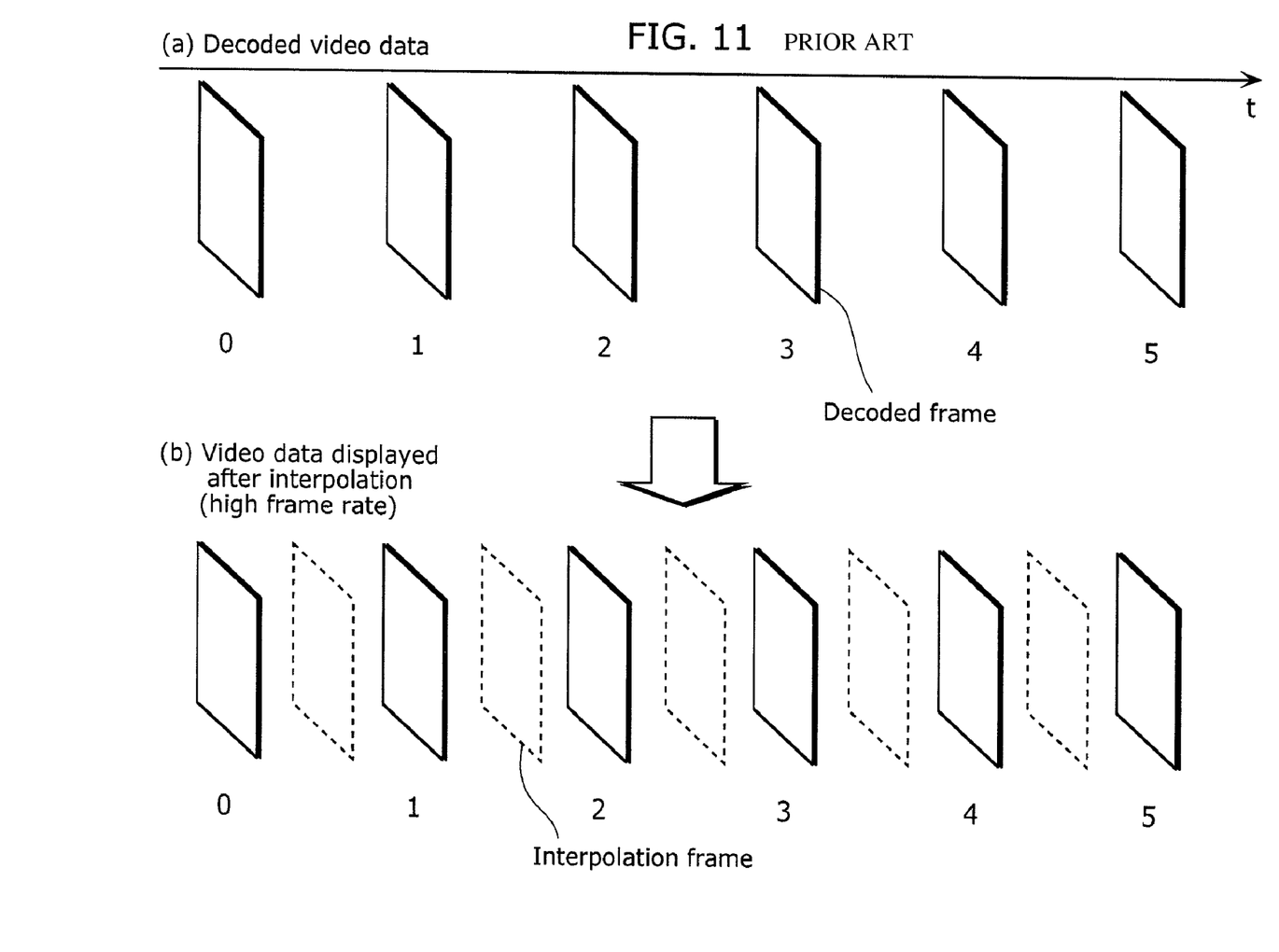
FIG. 11 shows a basic concept regarding generation of interpolation frames for the purpose of reproduction at a high frame rate.

FIGS. 10 and 11 show basic concepts of generation of interpolation frames. FIG. 10 illustrates generation of interpolation frames for the purpose of reproduction in slow motion. FIG. 11 illustrates generation of interpolation frames for the purpose of reproduction at a high frame rate. In these figures, frames of solid lines represent decoded frames, and frames of dashed lines interpolation frames. In FIG. 10, the reproduction in slow motion is achieved by reproducing a series of video frames with interpolation frames interpolated therebetween at the same frame rate as that for the original decoded video. In FIG. 11, the reproduction at a high frame rate is achieved by reproducing a series of video frames with interpolation frames interpolated therebetween at a frame rate twice as high as the original frame rate.

These interpolation frames are generated by calculating motion vectors from the coded frames and executing motion compensation for the coded frames, so that the decoded frames with the interpolation frames interpolated therebetween are displayed smoothly as described above.

In order to achieve such purposes, there are techniques relating to apparatuses that estimate motion vectors and generates interpolation frames. Patent Reference 1 (Japanese Unexamined Patent Application Publication No. 2005-6275) shows one example of such conventional techniques.

Figure 12:
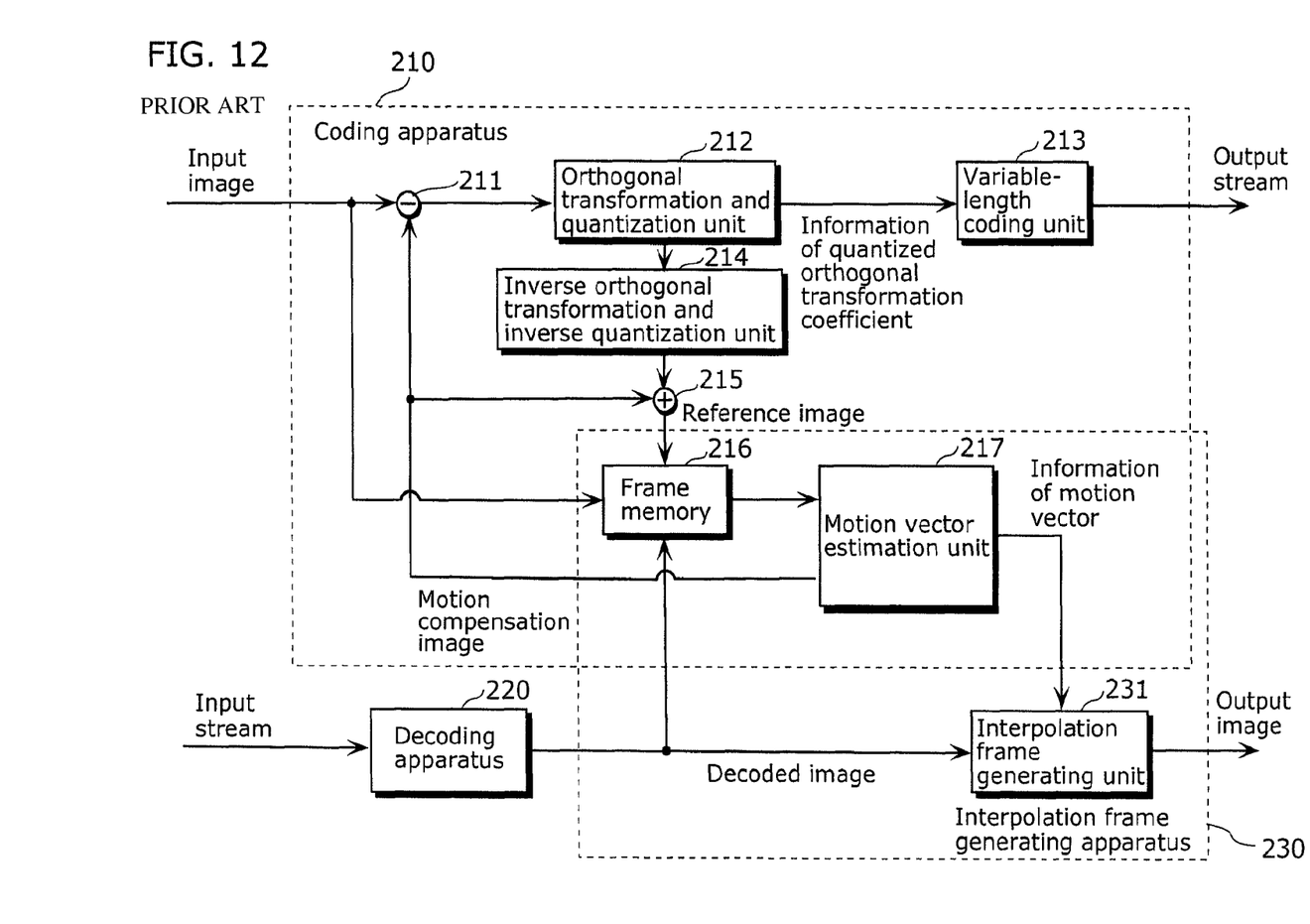
FIG. 12 is a block diagram that shows a configuration of a conventional interpolation frame generating codec apparatus.

FIG. 12 is a block diagram that shows a configuration of a codec apparatus described in Patent Reference 1. The codec apparatus shown in FIG. 12 includes a coding apparatus 210, decoding apparatus 220, and an interpolation frame generating apparatus 230.

The coding apparatus 210 codes an input image and outputs a coded stream. The coding apparatus 210 includes a subtractor 211, an orthogonal transformation and quantization unit 212, a variable-length coding unit 213, an inverse orthogonal transformation and inverse quantization unit 214, an adder 215, a frame memory 216, and a motion vector estimation unit 217.

The decoding apparatus 220 decodes an inputted coded stream and outputs a decoded video stream resulting from the decoding to the interpolation frame generating apparatus 230.

The interpolation frame generating apparatus 230 estimates motion vectors in the decoded video stream in order to generate an interpolation frame and interpolate the interpolation frame in the video stream. The interpolation frame generating apparatus 230 includes an interpolation frame generating unit 231. Further, the interpolation frame generating apparatus 230 and the coding apparatus 210 share the frame memory 216 and the motion vector estimation unit 217.

Described below is an operation of the conventional codec apparatus in FIG. 12. First described is an operation in a coding process.

When an input image is inputted into the codec apparatus, the input image is stored in the frame memory 216. Meanwhile, for prediction coding, the subtractor 211 calculates difference between the input image and a motion compensation image, and a resulting differential image is inputted into the orthogonal transformation and quantization unit 212.

The orthogonal transformation and quantization unit 212 transforms the differential image into an orthogonal transformation coefficient, and then quantize the orthogonal transformation coefficient using a predetermined parameter. The quantized orthogonal transformation coefficient is outputted as information of quantized orthogonal transformation coefficient to the variable-length coding unit 213 and the inverse orthogonal transformation and inverse quantization unit 214. The variable-length coding unit 213 executes variable-length coding on the information of quantized orthogonal transformation coefficient and outputs resulting variable-length coded information as an output stream.

In order to generate a local decoded image for motion compensation, the inverse orthogonal transformation and inverse quantization unit 214 reconstructs the differential image by executing inverse-quantization and inverse-orthogonal-transformation on the quantized orthogonal transformation coefficient information. The differential image is added to the motion compensation image by the adder 215 and stored in the frame memory 216 as a reference image to be used for motion vector estimation.

The motion vector estimation unit 217 retrieves the input image and the reference image from the frame memory 216, estimates motion vectors, executes motion compensation, and outputs the motion compensation image.

Next described is an operation for generating an interpolation frame in a decoding process.

A coded input stream is inputted into the decoding apparatus 220. The decoding apparatus 220 decodes the input stream and outputs a decoded image resulting from the decoding to the frame memory 216 and the interpolation frame generating unit 231 of the coding unit 210.

The motion vector estimation unit 217 retrieves a plurality of the decoded images stored in the frame memory 216, estimates motion vectors to be used for generating interpolation frames, and then outputs information of the motion vectors to the interpolation frame generating unit 231.

The interpolation frame generating unit 231 generates, on the basis of the plurality of the decoded images and the information of the motion vectors, interpolation frames to be interpolated between the decoded images, and then outputs the interpolation frames as output images.

For the technique shown in Patent Reference 1, the motion vector estimation unit 217 is used both for the coding process and for the decoding and interpolation frame generating process. These processes are executed through a common process of motion vector estimation.

SUMMARY OF THE INVENTION

The conventional technique above, however, has a problem that image quality of the generated interpolation frames is not optimal because motion vectors estimated for generation of interpolation frames are not necessarily appropriate.

For the conventional technique above, the motion vector estimation function is used both for the coding process and for the decoding and interpolation frame generating process for the purpose of reducing hardware resources to be used for the motion vector estimation. Moreover, since the motion vector estimation function in the video coding unit is used for both of these processes, a cost calculating formula to be used for estimating motion vectors is also used in common. Consequently, the resulting motion vectors are not necessarily appropriate for generation of interpolation frames in decoding. The image quality of the generated interpolation frames is thus not necessarily optimal.

The present invention has an object of providing a video codec apparatus and a video codec method. The video codec apparatus is capable of estimating optimal motion vectors both for the coding process and for the decoding and interpolation frame generating process, so that coding efficiency in the coding process and image quality of interpolation frames generated in the decoding and interpolation frame generating process are increased.

In order to address the problem, a video codec apparatus that codes video data, decodes the coded video data, and generates an interpolation frame in the decoding, the video codec apparatus including: a first motion vector estimation unit configured to calculate an evaluation value using one of predetermined calculating formulas, and estimate a first motion vector for the video data using the calculated evaluation value, the evaluation value being to be used for evaluating a correlation between images; a coding unit configured to code the video data using the first motion vector and output a coded stream; a decoding unit configured to decode the coded stream and output video frames resulting from the decoding; a frame interpolation unit configured to generate an interpolation frame using the first motion vector and the video frames; and a calculating formula selecting unit configured to select one of the predetermined calculating formulas depending upon whether the first motion vector estimation unit is estimating a motion vector for the coding or for the generating the interpolation frame, wherein the first motion vector estimation unit is used both for the coding and for the generating the interpolation frame and is configured to calculate the evaluation value using the calculating formula selected by the calculating formula selecting unit and estimate the first motion vector using the calculated evaluation value.

This configuration will allow estimating optimal motion vectors both for the coding and the generating interpolation frames, so that coding efficiency in the coding process and image quality of interpolation frames generated in the decoding process are increased.

Furthermore, the predetermined calculating formulas may include a first calculating formula for calculating the evaluation value with regard to an amount of code of the first motion vector; and a second calculating formula for calculating the evaluation value with regard to a correlation between video frames to be used for estimating the first motion vector, wherein the calculating formula selecting unit is configured to select the first calculating formula when the coding is being executed, and to select the second calculating formula when the interpolation frame is being generated.

This configuration estimates, in the coding process, by weighting an amount of code, and estimates motion vector that is closer to an actual motion in the interpolation frame generating process.

Furthermore, it is also possible that in the first calculating formula, the evaluation value decreases with a decrease in the amount of code, and in the second calculating formula, the evaluation value decreases with an increase in the correlation, wherein the first motion vector estimation unit is configured to estimate the first motion vector that makes the evaluation value smaller.

This configuration reduces the amount of code in the coding process and generates an interpolation frame that indicates a motion closer to an actual motion in the interpolation frame generating process.

Furthermore, the video codec apparatus may further include: a motion compensation unit configured to generate a motion compensation image frame using the first motion vector, the motion compensation unit being used both for the coding and for the generating the interpolation frame, wherein the coding unit is configured to code the video data using the motion compensation image frame, and the frame interpolation unit is configured to generate the interpolation frame using the motion compensation image frame.

This configuration reduces hardware resources required for generating an interpolation frame.

Furthermore, the video codec apparatus may further include a second motion vector estimation unit configured to estimate a second motion vector indicating a finer motion than the first motion vector, wherein the frame interpolation unit is configured to generate the interpolation frame using the second motion vector. For example, the first motion vector estimation unit is configured to estimate a motion vector on a block-by-block basis, and the second motion vector estimation unit is configured to estimate a motion vector on a pixel-by-pixel basis.

This configuration generates an interpolation frame that indicates a motion closer to an actual motion.

Furthermore, the video codec apparatus may further include a third motion vector estimation unit configured to estimate a third motion vector having a higher precision than the first motion vector, wherein the coding unit is configured to code the video data using the third motion vector.

This configuration uses not motion vectors with precisions beyond necessity but motion vectors with precisions necessary for generating interpolation frames; thus, less hardware resources are required for generating interpolation frames.

The present invention is embodied not only as an apparatus but also as a method that includes steps of process executed in the apparatus, or as a program that causes a computer to execute the steps. It is also possible that the all or some of the components that constitute the apparatuses mentioned above are implemented on one system large scale integration (LSI).

The video codec apparatus according to the present invention is capable of estimating optimal motion vectors both for the coding process and in the decoding and interpolation frame generating process, so that coding efficiency in the coding process and image quality of interpolation frames generated in the decoding and interpolation frame generating process are increased.

FURTHER INFORMATION ABOUT TECHNICAL BACKGROUND TO THIS APPLICATION

The disclosure of Japanese Patent Application No. 2008-003729 filed on Jan. 10, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENTS

Hereinafter, an embodiment of the present invention is described with reference to figures.

Figure 1:
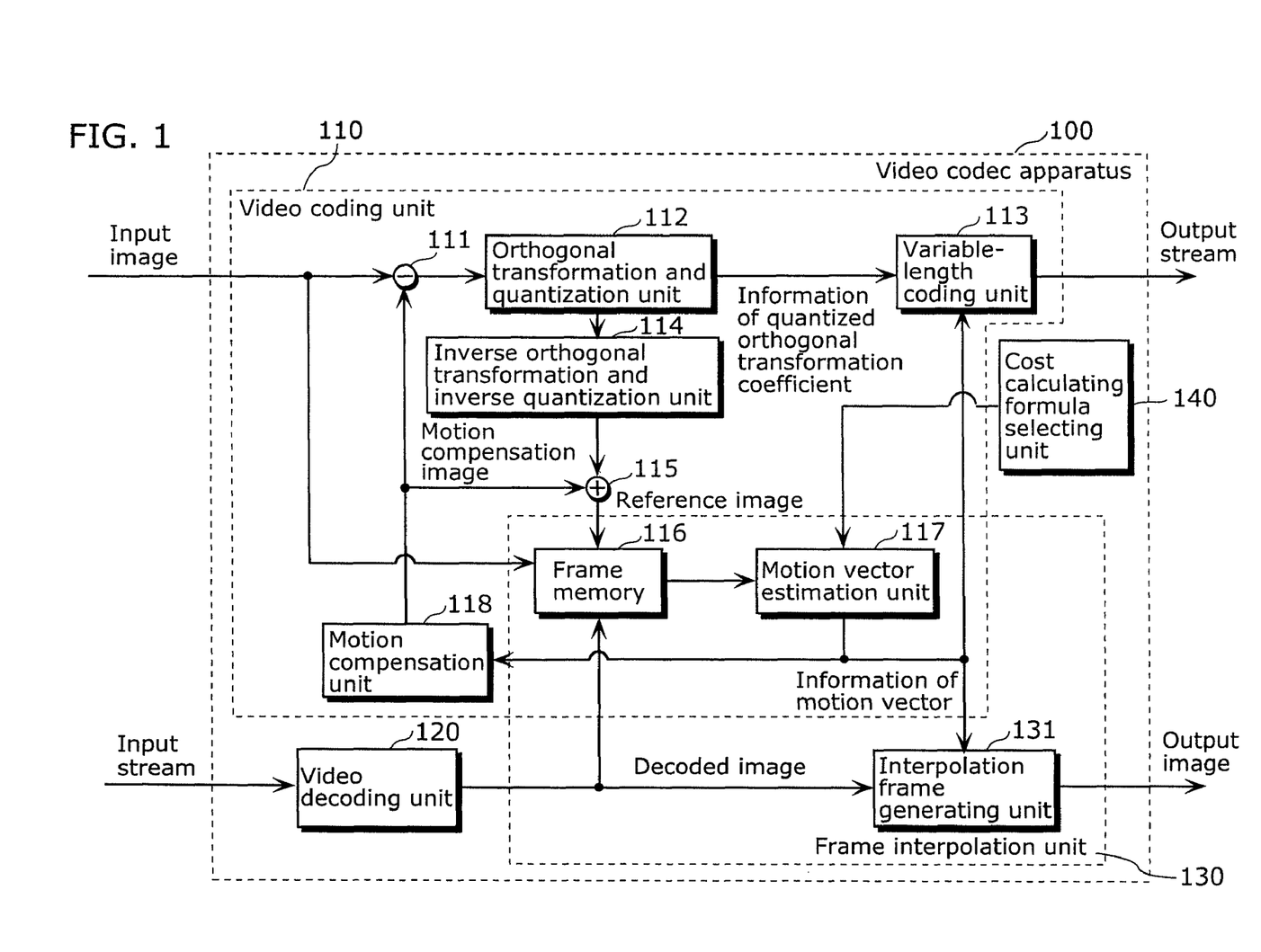
FIG. 1 is a block diagram of a video apparatus according to the present invention.

FIG. 1 is a block diagram of the video codec apparatus 100 according to the present invention. The video codec apparatus 100 in FIG. 1 uses a function of motion vector estimation both for coding process and for interpolation frame generation in decoding process. In these processes, a cost calculating formula for calculating a cost (evaluation value) to be used for evaluation of a correlation between images to estimate motion vectors is selected depending upon operation modes. The operation modes are a coding mode and an interpolation frame generating mode. The video codec apparatus 100 includes a video coding unit 110, a video decoding unit 120, a frame interpolation unit 130, and a cost calculating formula selecting unit 140.

The video coding unit 110 codes video data and outputs a stream resulting from the coding. The coding unit 110 includes a subtractor 111, an orthogonal transformation and quantization unit 112, a variable-length coding unit 113, an inverse orthogonal transformation and inverse quantization unit 114, an adder 115, a frame memory 116, a motion vector estimation unit 117, and a motion compensation unit 118. The motion vector coding unit 110 and the frame interpolation unit 130 share the frame memory 116 and the motion vector estimation unit 117.

The subtractor 111 calculates difference between an input image inputted into the video coding unit 110 and a motion compensation image, and then outputs the difference as a differential image to the orthogonal transformation and quantization unit 112.

The orthogonal transformation and quantization unit 112 executes orthogonal transformation on the differential image inputted from the subtractor 111 and quantizes, using a predetermined parameter, an orthogonal transformation coefficient resulting from the transformation. The quantized orthogonal transformation coefficient is outputted as information of quantized orthogonal transformation coefficient to the variable-length coding unit 113 and the inverse orthogonal transformation and inverse quantization unit 114.

The variable-length coding unit 113 executes variable-length coding on the information of quantized orthogonal transformation coefficient and output it as an output stream.

In order to generate a local decoded image to be used for motion compensation, the inverse orthogonal transformation and inverse quantization unit 114 reconstructs a differential image by executing inverse quantization and inverse orthogonal transformation on the information of quantized orthogonal transformation coefficient.

The adder 115 adds the reconstructed differential image to the motion compensation image and stores a resulting image in the frame memory 116 as a reference image to be used for motion vector estimation.

The frame memory 116 stores a plurality of video frames such as the input image inputted into the video coding unit 110 and the reference image inputted from the adder 115.

The motion vector estimation unit 117 estimates motion vectors between video frames retrieved from the frame memory 116. The motion vector estimation unit 117 retrieves the input image and the reference image from the frame memory 116, estimates motion vectors between the two images using a cost calculating formula selected by the cost calculating formula selecting unit 140, and then outputs information of the estimated motion vectors to the motion compensation unit 118.

The motion compensation unit 118 generates a motion compensation image by executing motion compensation using the motion vectors and the reference image, and outputs the generated motion compensation image to the subtractor 111 and the adder 115.

The video decoding unit 120 decodes a coded stream and outputs a plurality of decoded video frames resulting from the decoding to the frame interpolation unit 130.

The frame interpolation unit 130 generates interpolation frames by estimating motion vectors on the basis of a plurality of decoded video frames and interpolates the generated interpolation frames in a video stream to be outputted. The frame interpolation unit 130 includes an interpolation frame generating unit 131. In addition, as described above, the frame interpolation unit 130 and the video coding unit 110 share the frame memory 116 and the motion vector estimation unit 117.

The interpolation frame generating unit 131 generates interpolation frames on the basis of the plurality of decoded video frames and the information of motion vectors outputted from the motion vector estimation unit 117. For example, the interpolation frame generating unit 131 halves motion vectors estimated between two temporally continuous video frames and uses the halved motion vectors for motion compensation. An interpolation frame that is temporally at the midpoint of the two video frames is thereby generated.

The cost calculating formula selecting unit 140 detects whether the video codec apparatus 100 is in the coding mode or the interpolation frame generating mode and selects a cost calculating formula that is optimal in the detected mode. The cost calculating formula selecting unit 140 then outputs a control signal to switch to the selected cost calculating formula to the motion vector estimation unit 117.

Next described is an operation of the video codec apparatus 100 according to the present embodiment. For the present embodiment, there are two operation modes: coding mode and decoding and interpolation frame generating mode. An operation in the coding mode is described as follows.

When an input image is inputted into the video codec apparatus 100, the input image is stored in the frame memory 116. Meanwhile, for prediction coding, the subtractor 111 calculates difference between the input image and a motion compensation image, and a resulting differential image is inputted into the orthogonal transformation and quantization unit 112.

The orthogonal transformation and quantization unit 112 transforms the differential image into an orthogonal transformation coefficient, and then quantizes the orthogonal transformation coefficient using a predetermined parameter. The orthogonal transformation and quantization unit 112 subsequently outputs the quantized orthogonal transformation coefficient as information of quantized orthogonal transformation coefficient to the variable-length coding unit 113 and the inverse orthogonal transformation and inverse quantization unit 114. The variable-length coding unit 113 executes variable-length coding on the quantized orthogonal transformation coefficient information and outputs resulting variable-length coded information as an output stream.

In order to generate a local decoded image for motion compensation, the inverse orthogonal transformation and inverse quantization unit 114 reconstructs the differential image by executing inverse quantization and inverse orthogonal transformation on the quantized orthogonal transformation coefficient information. The reconstructed differential image is added to the motion compensation image by the adder 115 and stored in the frame memory 116 as a reference image to be used for motion vector estimation.

The motion vector estimation unit 117 retrieves the input image and the reference image from the frame memory 116, estimates motion vectors, and outputs the estimated motion vector to the motion compensation unit 118. The motion compensation unit 118 executes motion compensation and outputs a motion compensation image.

An operation of the interpolation frame generating process in the decoding and interpolation frame generating mode is described as follows.

A coded input stream is inputted into the video decoding unit 120. The video decoding unit 120 decodes the input stream and outputs a decoded image resulting from the decoding to the frame memory 116 and the interpolation frame generating unit 131.

The motion vector estimation unit 117 retrieves a plurality of the decoded images stored in the frame memory 116, estimates motion vectors to be used for generating interpolation frames, and then outputs information of the motion vectors to the interpolation frame generating unit 131. The interpolation frame generating unit 131 generates, on the basis of the plurality of the decoded images resulting from the decoding and the information of the motion vectors, interpolation frames to be interpolated into the decoded images, and then outputs the decoded images with the interpolation frames interpolated therebetween as output images.

In the present embodiment, the motion vector estimation unit 117 is used in both operations in the coding mode and in the decoding and interpolation frame generating mode as described above. Here, according to the present embodiment, the cost calculating formula selecting unit 140 selects one of the cost calculating formulas for calculating costs (evaluation values) to be used for evaluation of a correlation between images depending upon the operation modes. This reduces an amount of code in the operation in the coding mode and optimizes image quality of interpolation frames in the operation in the decoding and interpolation frame generating mode.

Figure 2:
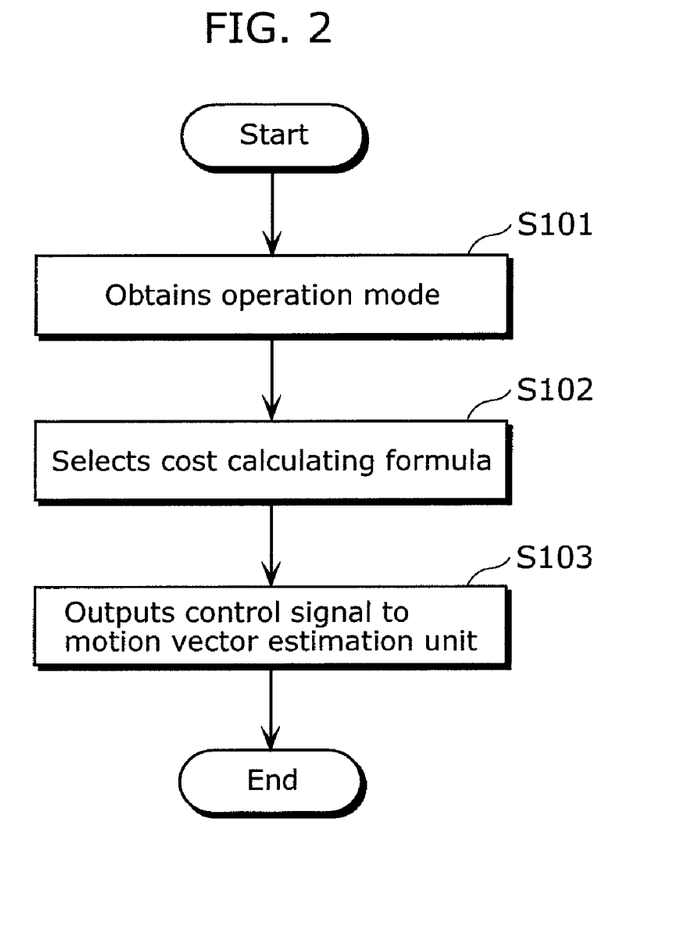
FIG. 2 is a flowchart of an operation of a cost calculating formula selecting unit.

FIG. 2 is a flowchart of an operation of the cost calculating formula selecting unit 140.

First, the cost calculating formula selecting unit 140 obtains the current operation mode of the video codec apparatus 100 (S101). For example, the cost calculating formula selecting unit 140 obtains whether the video codec apparatus 100 is in the coding mode or the interpolation frame generating mode from a control unit (not shown) of the video codec apparatus. The cost calculating formula selecting unit 140 may be configured to detect the current operation mode of the video codec apparatus.

Figure 3:
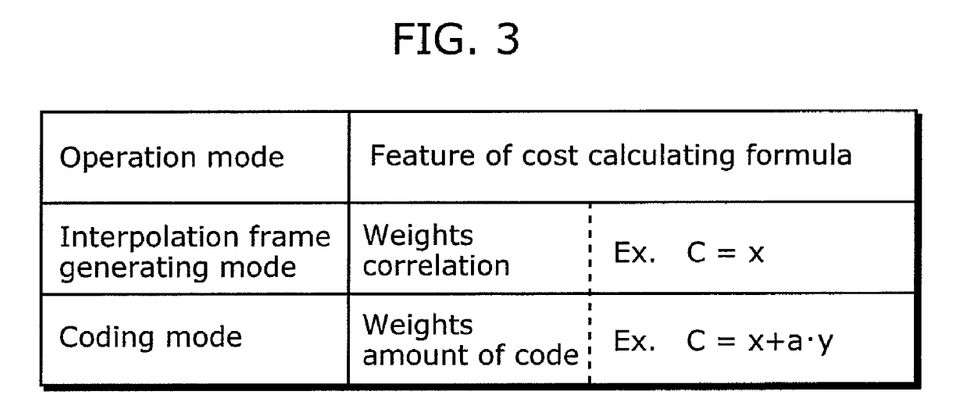
FIG. 3 shows an exemplary relationship between operation modes and cost calculating formulas.

Next, the cost calculating formula selecting unit 140 selects one of the cost calculating formulas depending upon the obtained operation mode. FIG. 3 shows an exemplary relationship between the operation modes and the cost calculating formulas. As shown in FIG. 3, the cost calculating formula to be selected for the interpolation frame generating mode weights a correlation between the reference image and the image to be coded. This is because it is important to increase the correlation in order to generate interpolation frames as approximate as possible to the temporally previous and next frames. Equation 1 is an exemplary cost calculating formula.

$$C=x \qquad \text{(Equation 1)}$$

In Equation 1, C denotes cost (evaluation value), and x, which is, for example, a sum of absolute differences or a sum of squared differences, denotes a correlation of pixel data between two blocks. When using Equation 1, the motion vector estimation unit 117 estimates a motion vector that minimizes the cost C, that is, a motion vector for the highest correlation.

Meanwhile, the cost calculating formula to be selected for the coding mode weights amounts of code of motion vectors. This is because it is important to reduce amounts of code in order to increase efficiency of coding. Equation 2 is an exemplary cost calculating formula.

$$C=x+a \cdot y \qquad \text{(Equation 2)}$$

In Equation 2, C denotes cost (evaluation value), x denotes a value equivalent to an amount of differential code that is based on a sum of absolute differences or the like, y denotes a value equivalent to an amount of code of a motion vector, and a denotes adjustment parameter. Adjusting the adjustment parameter a changes a degree to which the amount of code of a motion vector is weighted.

When a=0, Equation 2 becomes identical to Equation 1. It is thus also possible that the cost calculating formula selecting unit 140 changes the value for a depending upon the operation modes. In this case, a may be other than zero even for the interpolation frame generating mode.

Finally, the cost calculating formula selecting unit 140 outputs, to the motion vector estimation unit 117, a control signal to switch the cost calculating formula to the selected one (S103). The motion vector estimation unit 117 estimates motion vectors using the cost calculating formula to which the control signal has switched. For example, the motion vector estimation unit 117 estimates a motion vector that minimizes the cost C in the cost calculating formula.

Figure 4:
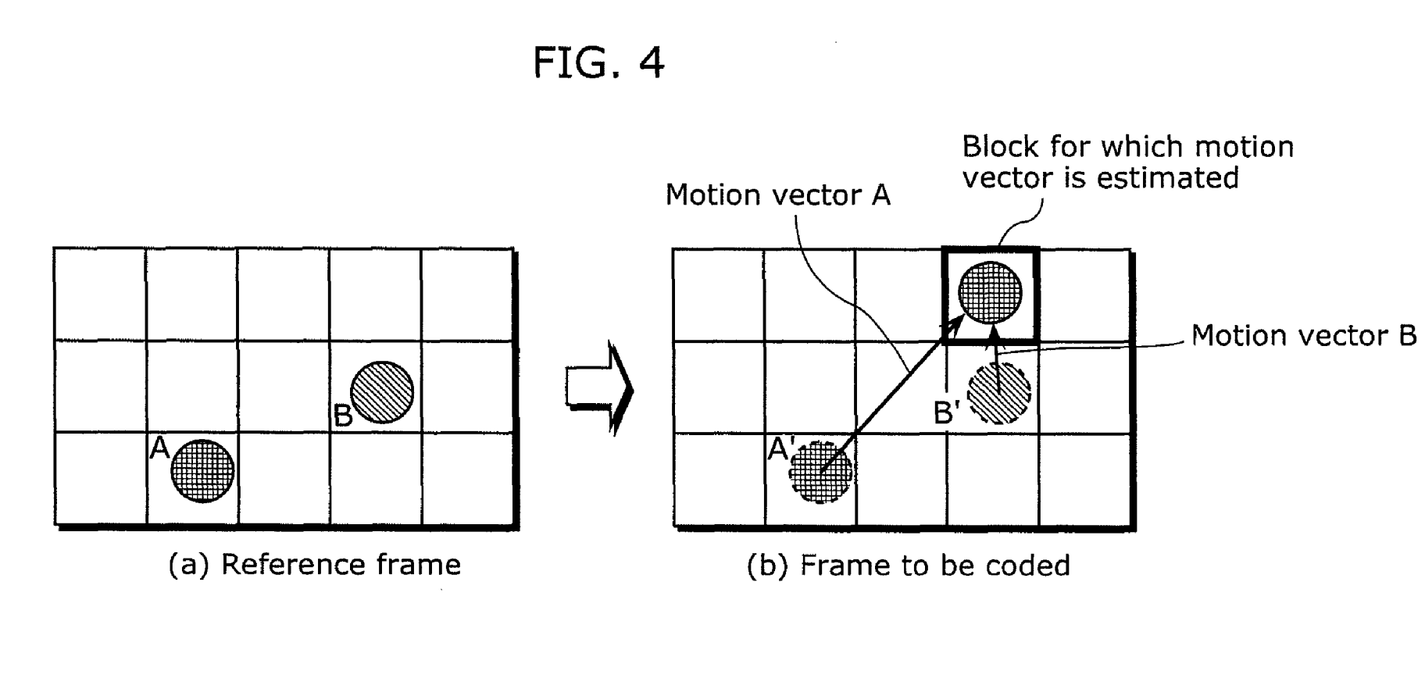
FIG. 4 illustrates how a motion vector is selected using cost calculating formulas.

FIG. 4 illustrates how a motion vector is selected using the cost calculating formulas. FIG. 4(a) shows a reference frame, and FIG. 4(b) shows a frame to be coded. Here, in the interpolation frame generating mode, the reference frame and the frame to be coded are temporally continuous, and they are a previous frame and a present frame to be coded, respectively.

The bold-line square in the frame to be coded shown in FIG. 4 (b) indicates a block for which a motion vector is to be estimated. In the present embodiment, it is assumed that motion compensating prediction from the previous frame is executed for the circular object in the block for which motion vector is to be estimated. Positions of the dashed-line circles A' and B' in the frame to be coded correspond to positions of A and B in the reference frame. It is also assumed that the object A in the reference frame moves to the block for which motion vector is to be estimated in the frame to be coded. In other words, a motion vector A shown in FIG. 4(b) indicates actual motion of the object A. It is also assumed that the object B is similar to the object A.

The object A has the highest correlation with the object in the block for which a motion vector is to be estimated. The motion vector between them (motion vector A) is large because they are distant from each other. On the other hand, the object B is similar to the object in the block for which a motion vector is to be estimated, but has a lower correlation with the object than the object A. The motion vector between them (motion vector B) is, however, small because they are next to each other.

The cost calculating formula selecting unit 140 switches the cost calculating formula to, for example, Equation 1 when the video codec apparatus 100 is in interpolation frame generating mode. The motion vector estimation unit 117 uses the selected cost calculating formula to estimate a motion vector for the highest correlation. Consequently, the motion vector A is estimated in the case shown in FIG. 4.

The cost calculating formula selecting unit 140 switches the cost calculating formula to, for example, Equation 2 when the video codec apparatus 100 is in the coding mode. The motion vector estimation unit 117 uses the selected cost calculating formula to estimate a motion vector that minimizes the amount of code. Consequently, the motion vector B is estimated in the case shown in FIG. 4 (when it is assumed that using the motion vector B results in a less amount of code than using the motion vector A).

As described thus far, the video codec apparatus according to the present invention uses the motion vector estimation function both for the coding process and for the decoding and interpolation frame generating process to reduce hardware resources. Furthermore, the video codec apparatus not only generates interpolation frames but also adaptively switches the cost calculating formulas for the coding process and the decoding and the interpolation frame generating process in order to estimate appropriate motion vectors depending on purposes. In other words, the video codec apparatus will increase in efficiency of coding in the coding process and improve image quality of interpolation frames in the decoding and interpolation frame generating process.

VARIATIONS OF THE EMBODIMENTS

The present embodiment has several variations shown below.

Figure 5:
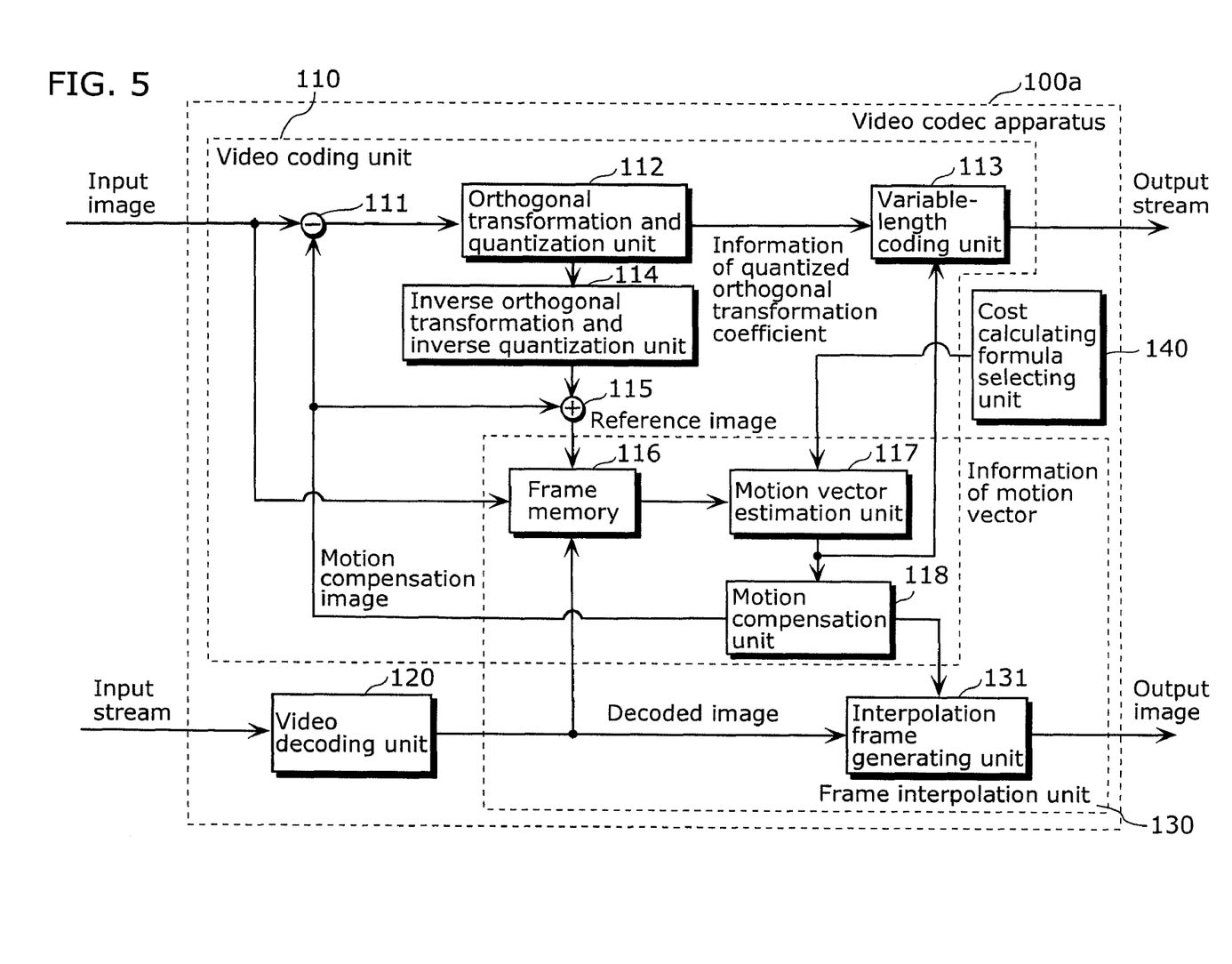
FIG. 5 is a block diagram to show a variation of a video codec apparatus according to the present invention.

For example, FIG. 5 is a block diagram to show a variation of the video codec apparatus according to the present invention. For a video codec apparatus 100a shown in FIG. 5, the video coding unit 110 and the frame interpolation unit 130 share the motion compensation unit 118 in addition to the motion vector estimation unit 117. This will further reduce the hardware resources.

Figure 6:
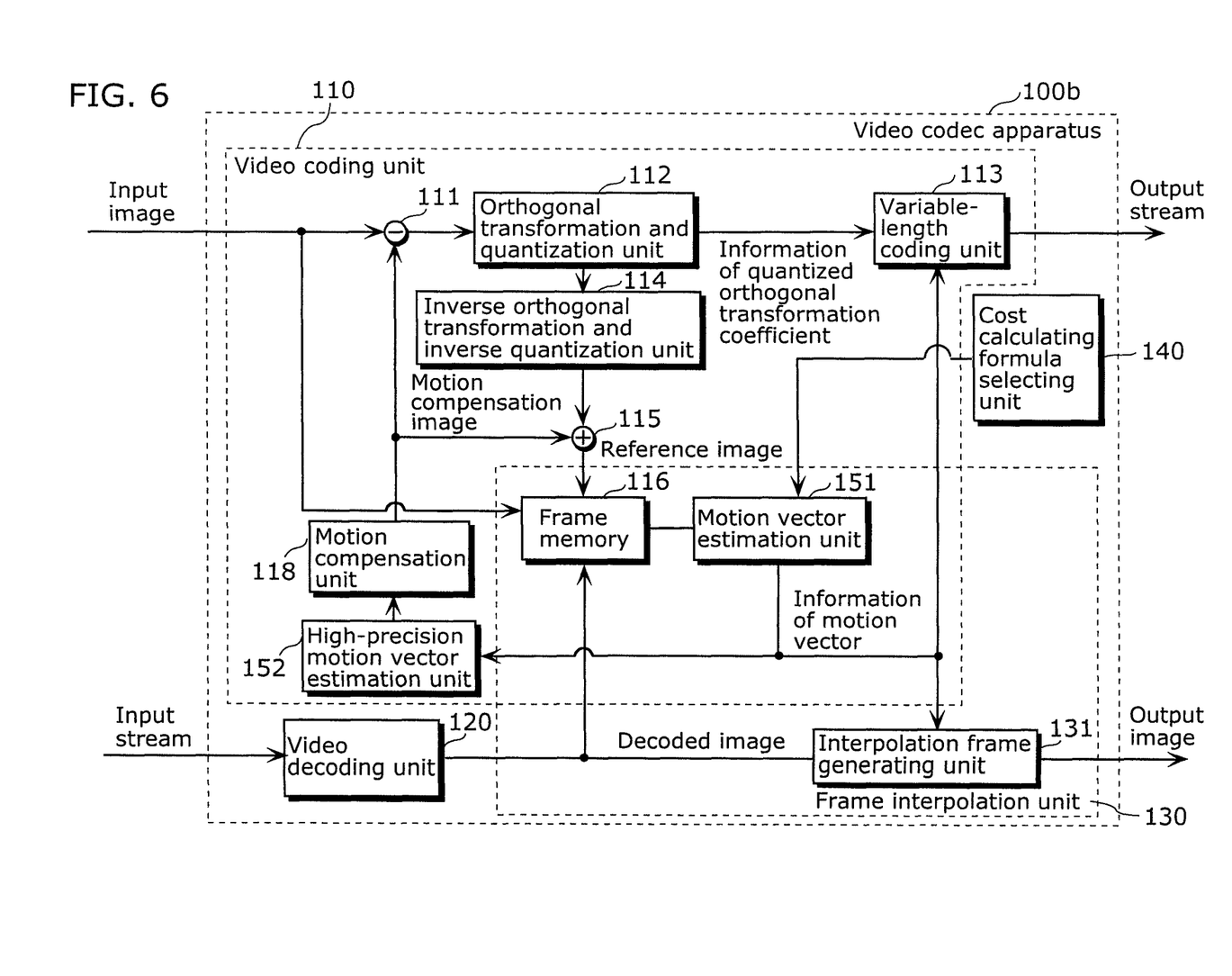
FIG. 6 is a block diagram to show a variation of a video codec apparatus according to the present invention.

FIG. 6 is a block diagram to show another variation of the video codec apparatus according to the present invention. A video codec apparatus 100b shown in FIG. 6 has a motion vector estimation unit 151 instead of the motion vector estimation unit 117 in the apparatus shown in FIG. 1. The motion vector coding unit 110 and the frame compensation unit 130 share the motion vector estimation unit 151. Additionally, the video coding unit 110 includes a high-precision motion vector estimation unit 152.

The motion vector estimation unit 151 estimates motion vectors between video frames retrieved from the frame memory 116. The motion vector estimation unit 151 estimates integer-precision motion vectors, for example.

The high-precision motion vector estimation unit 152 estimates motion vectors with higher precision than the motion vector estimation unit 151. The motion vector estimation unit 152 estimates decimal-precision motion vectors, for example.

The interpolation frame generating unit 131 generates interpolation frames using motion vectors outputted from the motion vector estimation unit 151.

Motion vector estimation in coding is thus executed in two stages to increase accuracy of precision of coding. Furthermore, this configuration allows using not motion vectors with precisions beyond necessity but motion vectors with precisions necessary for generating interpolation frames.

Figure 7:
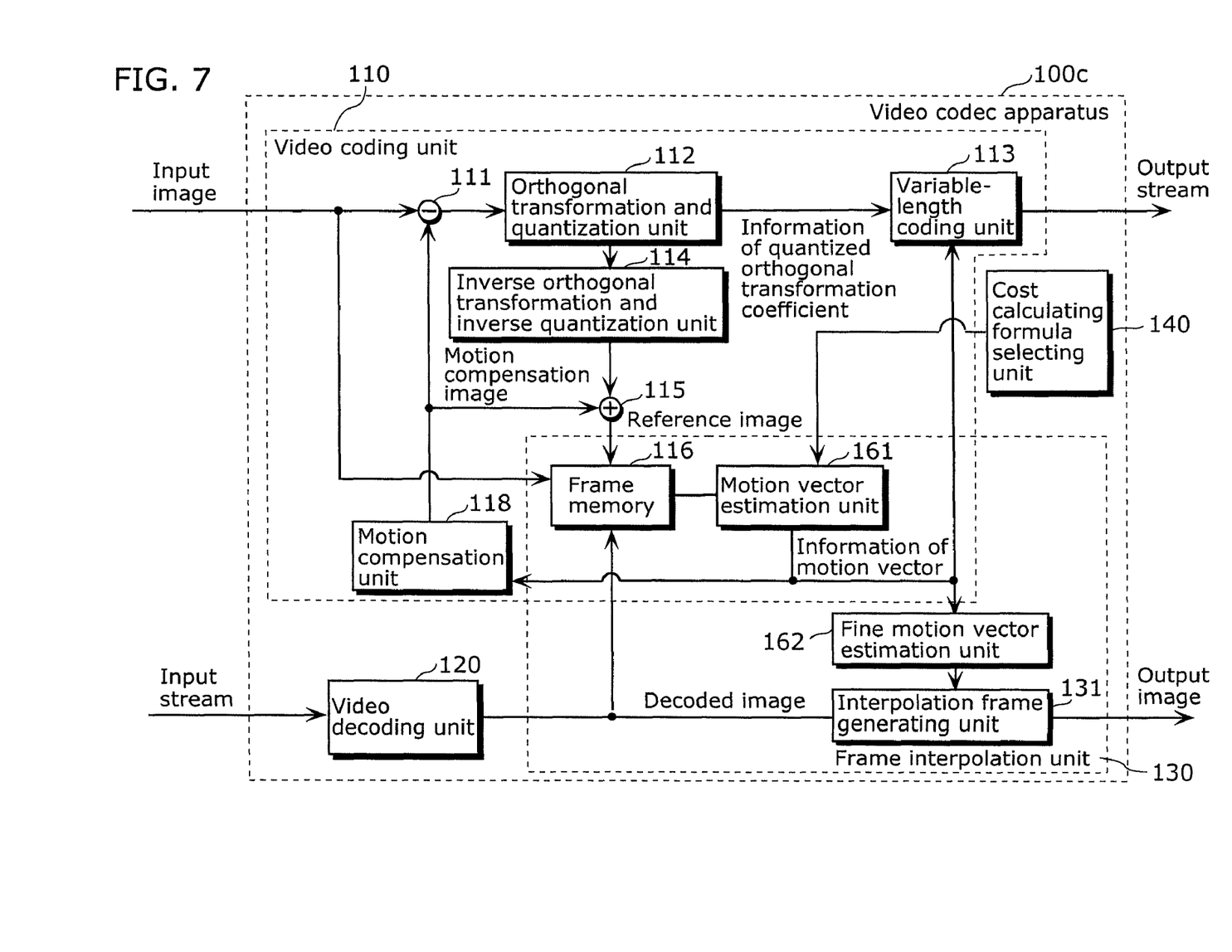
FIG. 7 is a block diagram to show a variation of a video codec apparatus according to the present invention.

FIG. 7 is a block diagram to show another variation of the video codec apparatus according to the present invention. A video codec apparatus 100c shown in FIG. 7 has a motion vector estimation unit 161 instead of the motion vector estimation unit 117 in the apparatus shown in FIG. 1. The motion vector coding unit 110 and the frame compensation unit 130 share the motion vector estimation unit 161. The frame interpolation unit 130 further includes a fine motion vector estimation unit 162.

The motion vector estimation unit 161 estimates motion vectors between video frames retrieved from the frame memory 116. The motion vector estimation unit 161 estimates motion vectors on a block-by-block basis, for example.

The fine motion vector estimation unit 162 estimates, using motion vectors estimated by the motion vector estimation unit 161, motion vectors that indicate finer motions. The motion vector estimation unit 162 estimates motion vectors on a pixel-by-pixel basis, for example.

The interpolation frame generating unit 131 generates interpolation frames using the motion vectors that indicate finer motions.

The interpolation frame generating unit 131 uses estimated motion vectors that are closer to actual motion for the interpolation frame generating process, thereby generating interpolation frames with higher quality.

The scope of the present invention is not limited to these embodiments of the video codec apparatus and method thereof described above. Without departing from the spirit of the present invention, any combination of these embodiments above and variations to be conceived by those skilled in the art or any embodiment configured by combining components in variations other than the above is within the scope of the present invention.

For example, the two operation modes described above, the coding mode and the interpolation frame generating mode of the video codec apparatus 100 according to the present embodiment, may be parallelized except in motion vector estimation process.

Specifically, the cost calculating formula selecting unit 140 may select a cost calculating formula depending on whether the motion vector estimation unit 117 executes process of motion vector estimation in the coding process or the interpolation frame generating process. In other words, a cost calculating formula that weights an amount of code (Equation 2, for example) is selected when the motion vector estimation unit 117 executes motion vector estimation process in the coding process. A cost calculating formula that weights correlation (Equation 1, for example) is selected when the motion vector estimation unit 117 executes motion vector estimation process in the interpolation frame generating process.

Figure 8:
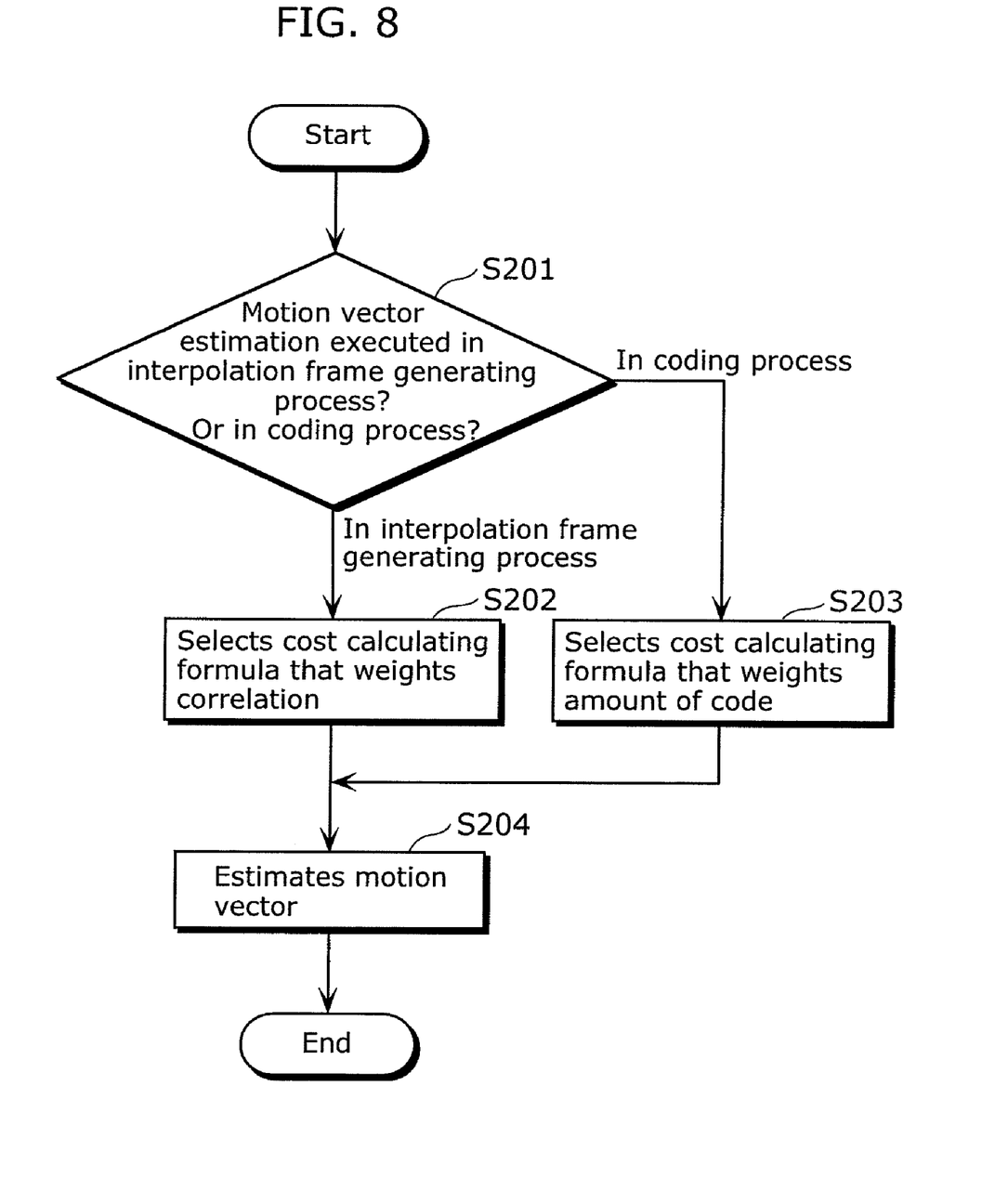
FIG. 8 is a flowchart of an exemplary operation of the cost calculating formula selecting unit and the motion vector estimation unit.

FIG. 8 is a flowchart of an exemplary operation of the cost calculating formula selecting unit 140 and the motion vector estimation unit 117.

When motion vector estimation process is executed, the cost calculating formula selecting unit 140 detects whether the motion vector estimation process is executed in the interpolation frame generating process or in the coding process (S201).

The cost calculation formula selecting unit 140 selects a cost calculating formula that weights correlation such as Equation 1 (S202) when the motion vector estimation process is executed in the interpolation frame generating process ("In interpolation frame generating process" in S201). The cost calculation formula selecting unit 140 selects a cost calculating formula that weights the amount of code such as Equation 2 (S203) when the motion vector estimation process is executed in the coding process ("In coding process" in S201). The cost calculating formula selecting unit 140 outputs, to the motion vector estimation unit 117, a control signal to switch to the selected cost calculating formula.

The motion vector estimation unit 117 estimates a motion vector using the cost calculating formula according to the control signal inputted from the cost calculation formula selecting unit 140 (S204).

The processes are thereby parallelized except in the motion vector estimation process that is used both for the coding process and the interpolation frame generating process. In other words, the video codec apparatus 100 executes not only either the coding process or the interpolation frame process but both of the coding process and the interpolation frame process in parallel. For example, the coding process and the interpolation frame process is executed in parallel so that image data obtained through shooting using a camera is coded and recorded while the image data is played back with interpolation frames generated simultaneously.

The cost calculation formula to be used in the present embodiment is not limited to Equation 1 or Equation 2. Any formula that can be used for estimating motion vectors suitable for coding or decoding and generating interpolation frames is applicable.

The motion vector estimation unit 117 according to the present embodiment is configured to have the plurality of cost calculating formulas and estimate a motion vector using one of the formulas according to the control signal inputted from the cost calculation formula selecting unit 140. It is also possible that the cost calculation formula selecting unit 140 is configured to have the plurality of cost calculating formulas and outputs, to the motion vector estimation unit 117, one of the formulas depending upon operation modes. In this case, the motion vector estimation unit 117 estimates a motion vector using the outputted cost calculating formula.

The motion vector estimation unit 117 according to the present embodiment is configured to estimate a motion vector that minimizes the cost calculated using the cost calculating formula. It is also possible that the motion vector estimation unit 117 is configured to estimate a motion vector smaller than a threshold predetermined for cost.

In the variation shown in FIGS. 6 and 7, estimation of motion vectors is executed in two stages. It is also possible that estimation of motion vector is executed in two or more stages and one or more stages of the motion vector estimation function are executed both for the coding process and the interpolation frame generating process.

The video codec apparatus 100 in FIG. 7 executes estimation of motion vectors in two stages of estimation on a pixel basis and on a block basis. This is merely an example and estimation may be also executed, for example, first on an eight-by-eight block basis and next on a four-by-four block basis. Specifically, any configuration with which motion vectors estimated in the second stage indicates finer motions than those in the first stage is applicable.

As mentioned above, the present invention is embodied not only as an video codec apparatus or a video codec method but also as a program that causes a computer to execute the method of video codec according to the present embodiment. The present invention may be also embodied as a computer-readable storage medium where the program is stored, such as a CD-ROM. It is also possible that the present invention is embodied as information, data, or signals that indicate the program. The program, information, data, and signals may be distributed via a communication network such as the Internet.

In the present invention, all or some of the components that constitute the video codec apparatus may be implemented on a single system LSI. The system LSI is a super-multi-functional LSI manufactured by integrating a plurality of components on one chip, and specifically, a computer system composed of microprocessors, ROMs and RAMs.

INDUSTRIAL APPLICABILITY

Figure 9A:
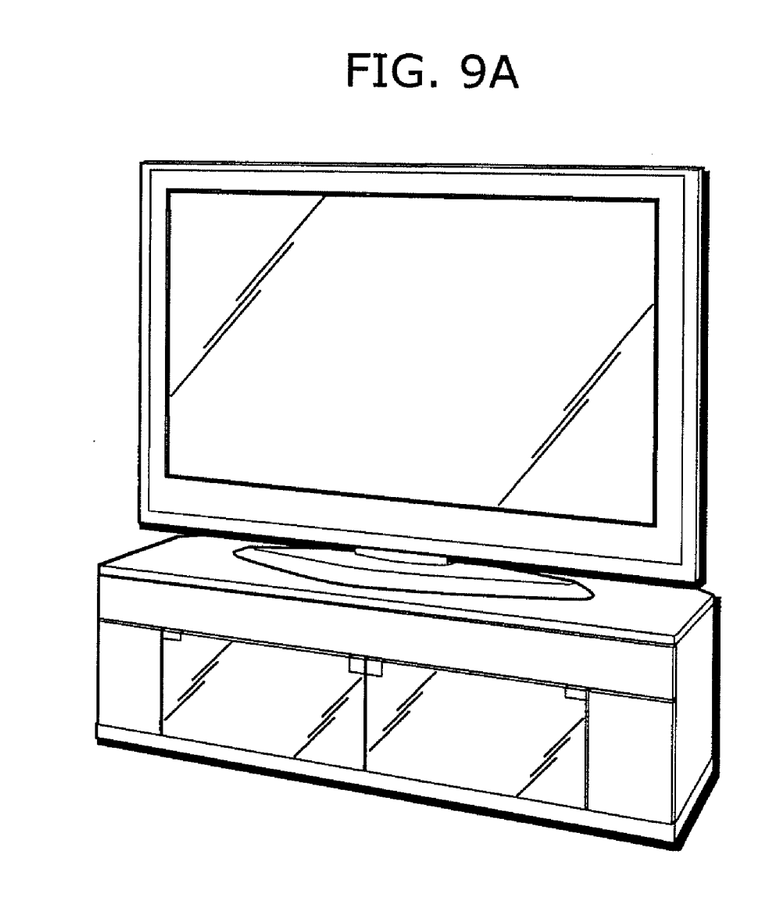
FIG. 9A shows an exemplary television that includes a video codec apparatus according to the present invention.
Figure 9B:
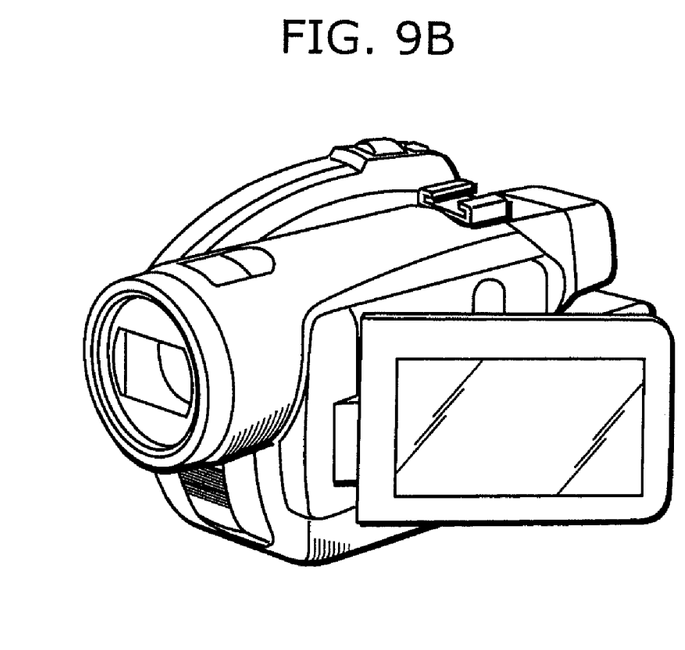
FIG. 9B shows an exemplary camera that includes a video codec apparatus according to the present invention.

The video codec apparatus and method according to the present invention is applicable as a codec apparatus that generates interpolation frames in a decoding process, and in particular, a video camera that reproduces smooth videos in slow motion as shown in FIGS. 9A and 9B, or a digital television that increases time resolution of videos and displays the videos on an LCD display.

What is claimed is:

1. A video codec apparatus that codes video data, decodes the coded video data, and generates an interpolation frame in the decoding, said video codec apparatus comprising:
    a first motion vector estimation unit configured to calculate an evaluation value using one of predetermined calculating formulas, and estimate a first motion vector for the video data using the calculated evaluation value, the evaluation value being to be used for evaluating a correlation between images;
    a coding unit configured to code the video data using the first motion vector and output a coded stream;
    a decoding unit configured to decode the coded stream and output video frames resulting from the decoding;
    a frame interpolation unit configured to generate an interpolation frame using the first motion vector and the video frames; and
    a calculating formula selecting unit configured to select one of the predetermined calculating formulas depending upon whether said first motion vector estimation unit is estimating a motion vector for the coding or for the generating the interpolation frame,
    wherein said first motion vector estimation unit is used both for the coding and for the generating the interpolation frame and is configured to calculate the evaluation value using the calculating formula selected by said calculating formula selecting unit and estimate the first motion vector using the calculated evaluation value.

2. The video codec apparatus according to claim 1,
wherein the predetermined calculating formulas include:
a first calculating formula for calculating the evaluation value with regard to an amount of code of the first motion vector; and
a second calculating formula for calculating the evaluation value with regard to a correlation between video frames to be used for estimating the first motion vector, and
wherein said calculating formula selecting unit is configured to select the first calculating formula when the coding is being executed, and to select the second calculating formula when the interpolation frame is being generated.

3. The video codec apparatus according to claim 2,
wherein, in the first calculating formula, the evaluation value decreases with a decrease in the amount of code,
in the second calculating formula, the evaluation value decreases with an increase in the correlation, and
wherein said first motion vector estimation unit is configured to estimate the first motion vector that makes the evaluation value smaller.

4. The video codec apparatus according to claim 3, further comprising
a motion compensation unit configured to generate a motion compensation image frame using the first motion vector, said motion compensation unit being used both for the coding and for the generating the interpolation frame,
wherein said coding unit is configured to code the video data using the motion compensation image frame, and
said frame interpolation unit is configured to generate the interpolation frame using the motion compensation image frame.

5. The video codec apparatus according to claim 3, further comprising
a second motion vector estimation unit configured to estimate a second motion vector indicating a finer motion than the first motion vector,
wherein said frame interpolation unit is configured to generate the interpolation frame using the second motion vector.

6. The video codec apparatus according to claim 5,
wherein said first motion vector estimation unit is configured to estimate a motion vector on a block-by-block basis, and
said second motion vector estimation unit is configured to estimate a motion vector on a pixel-by-pixel basis.

7. The video codec apparatus according to claim 3, further comprising
a third motion vector estimation unit configured to estimate a third motion vector having a higher precision than the first motion vector,
wherein said coding unit is configured to code the video data using the third motion vector.

8. A video codec method for coding video data, decoding the coded video data, and generating an interpolation frame in the decoding, said video codec method comprising:
calculating an evaluation value using one of predetermined calculating formulas, and estimating a first motion vector for the video data using the calculated evaluation value, the evaluation value being to be used for evaluating a correlation between images;
coding the video data using the first motion vector and outputting a coded stream;
decoding the coded stream and outputting video frames resulting from the decoding;
generating an interpolation frame using the first motion vector and the video frames; and
selecting one of the predetermined calculating formulas depending upon whether said estimating the first motion vector is executed for said coding or for said generating the interpolation frame,
wherein, in said estimating the first motion vector, the evaluation value is calculated using the calculating formula selected in said selecting the calculating formula, and the first motion vector is estimated using the calculated evaluation value.

9. An integrated circuit that codes video data, decodes the coded video data, and generates an interpolation frame in the decoding, said integrated circuit comprising:
a first motion vector estimation unit configured to calculate an evaluation value using one of predetermined calculating formulas, and estimate a first motion vector for the video data using the calculated evaluation value, the evaluation value being to be used for evaluating a correlation between images;
a coding unit configured to code the video data using the first motion vector and output a coded stream;
a decoding unit configured to decode the coded stream and output video frames resulting from the decoding;
a frame interpolation unit configured to generate an interpolation frame using the first motion vector and the video frames; and
a calculating formula selecting unit configured to select one of the predetermined calculating formulas depending upon whether said first motion vector estimation unit is estimating a motion vector for the coding or for the generating the interpolation frame,
wherein said first motion vector estimation unit is used both for the coding and for the generating the interpolation frame and is configured to calculate the evaluation value using the calculating formula selected by said calculating formula selecting unit and estimate the first motion vector using the calculated evaluation value.

* * * * *